United States Patent [19]
Rehfeld

[11] 3,893,528
[45] July 8, 1975

[54] FRONT BRAKE STEERING ASSIST

[75] Inventor: Frederick L. J. Rehfeld, Saginaw, Mich.

[73] Assignee: General Motors Corporation, Detroit, Mich.

[22] Filed: Sept. 17, 1974

[21] Appl. No.: 506,699

[52] U.S. Cl. ............................ 180/6.3; 180/79.2 R
[51] Int. Cl. ............................................. B62d 5/06
[58] Field of Search .......... 180/6.2, 6.24, 6.26, 6.3, 180/79.2 R, 79.2 B

[56] References Cited
UNITED STATES PATENTS

| | | | |
|---|---|---|---|
| 2,254,902 | 9/1941 | Milster | 180/6.3 |
| 2,360,843 | 10/1944 | Boldt | 180/6.3 |
| 3,603,424 | 9/1971 | Blood | 180/79.2 B |

FOREIGN PATENTS OR APPLICATIONS

| | | | |
|---|---|---|---|
| 750,517 | 6/1956 | United Kingdom | 180/6.24 |

*Primary Examiner*—David Schonberg
*Assistant Examiner*—John A. Pekar
*Attorney, Agent, or Firm*—Donald F. Scherer

[57] ABSTRACT

A temporary vehicle steering system in which steering is assisted by independent selective braking of the steerable vehicle wheels when the normal operator steering effort exceeds a predetermined value.

4 Claims, 1 Drawing Figure

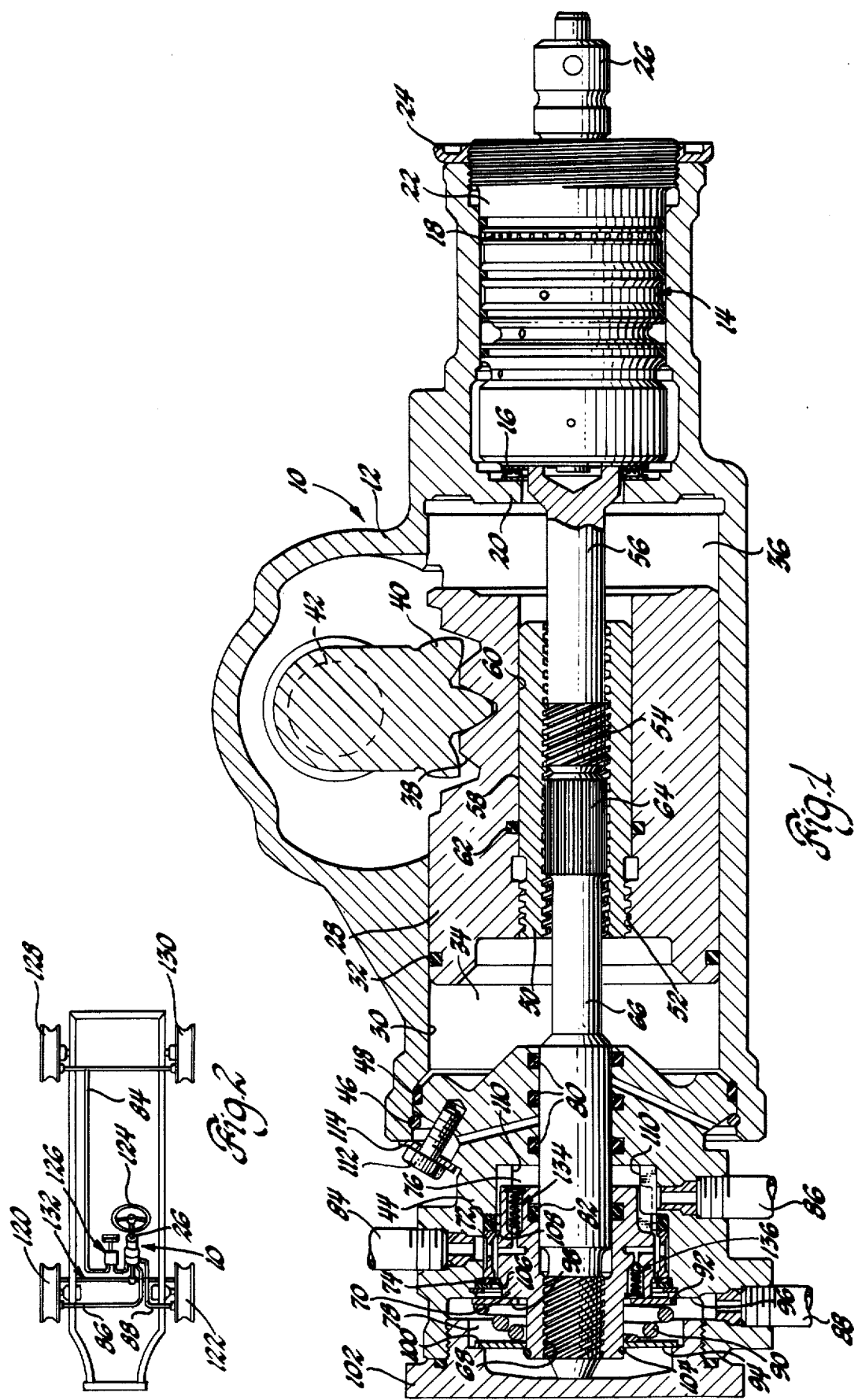

FRONT BRAKE STEERING ASSIST

This invention relates generally to vehicle steering systems and more particularly to novel apparatus for effecting temporary vehicle control by selectively braking one of the steerable wheels of the vehicle in response to a steering input.

The term "brake-steer," as it is used in the automotive industry, refers to a condition of vehicular operation wherein the directional control is at least partially effected by selectively braking one or more wheels of the vehicle. For example, if a typical automobile is moving in a straight ahead path of motion and one of the steerable front wheels is braked, the vehicle will turn in a direction corresponding to which wheel is braked. If the left front wheel is braked, the vehicle will turn left and vice versa. Heretofore, known brake-steer application have been suggested primarily for commercial vehicles such as large trucks and heavy construction vehicles wherein size and system complexity are relatively unimportant. Steering apparatus, according to the present invention, represents a novel application of brake-steer to passenger type automobiles wherein complexity and compactness are of the utmost importance.

The primary feature, then, of this invention is that it provides a new and improved steering apparatus for automotive vehicles. Another feature of this invention is that it provides a new and improved steering apparatus particularly adapted to effect temporary directional control of the vehicle through brake-steer when the torque input at the steering hand wheel necessary to effect conventional directional control exceeds a predetermined magnitude. Yet another feature of this invention resides in the provision in the new and improved steering apparatus of a hydraulic pump for selectively actuating the brake at either steerable wheel and a drive mechanism between the steering hand wheel and the pump which effects actuation of the pump in response to rotation of the hand wheel whenever the torque input at the hand wheel exceeds a predetermined magnitude.

A further feature of this invention resides in the provision in the new and improved steering apparatus responsive to the direction of rotation of the steering hand wheel for directing pressurized fluid from a pump to the one of the steerable wheels operative to effect brake-steer in the direction corresponding to the direction the hand wheel is turned. A still further feature of this invention resides in the provision in the new and improved steering apparatus of a pump having a reciprocating portion, a pump shaft threadedly engaging the piston so that rotation of the pump shaft effects pumping movement of the piston, and a torque sensitive drive mechanism between the pump shaft and a worm shaft in the steering gear assembly of the vehicle, the drive mechanism functioning to couple the worm shaft to the pump shaft under predetermined torque input conditions so that subsequent rotation of the worm shaft in response to normal torque input at the steering hand wheel effects actuation of the pump piston.

These and other features of this invention will be readily apparent from the following specification and from the drawings wherein:

FIG. 1 is a cross sectional view of a steering gear incorporating the preferred embodiment of the present invention; and FIG. 2 is a diagrammatic representation of a vehicle.

Referring to the drawings wherein like characters will represent the same or corresponding parts there is seen in FIG. 1 a power steering gear assembly, generally designated 10, having a housing 12 in which is disposed a steer control valve assembly 14. The steer control valve assembly 14 is constructed in accordance with the control valve shown in U.S. Pat. No. 3,022,772 issued to Zeigler et al Feb. 27, 1962. The control valve assembly 14 is rotatably supported in the housing 12 by a pair of needle bearings 16 and 18 which are positioned between the assembly 14 and a shoulder 20 on housing 12 and between the assembly 14 and a plug 22 respectively. The plug 22 is threadably connected to the housing 12 and is secured therein by a lock nut 24. The control valve assembly 14 is operated in response to rotation of a steering input shaft 26 in the manner disclosed in U.S. Pat. No. 3,022,722.

A power piston 28 is slidably disposed in bore 30 formed in the housing 12. An annular seal 32 cooperates with the piston and the bore to form two power cylinders 34 and 36 within the housing 12. The piston 28 has a rack tooth 38 formed thereon which rack tooth 38 meshes with a sector gear 40 formed on a steering output shaft 42 which is rotatably supported in the housing 12. The power cylinder 34 is closed by a housing 44 which is secured to the housing 12 by a locking ring 46. An annular seal 48 prevents fluid leakage past the outer diameter of the housing 44 and the bore 30.

A sleeve 50 is threadably connected at 52 to the piston 28 and is also threadably connected at 54 to a worm shaft 56, which worm shaft 56 is operatively connected to the control valve assembly 14 in accordance with the teaching of U.S. Pat. No. 3,022,722. The sleeve 50 also has an outer diameter 58 which is slidably disposed in an inner diameter 60 of piston 28. A seal 62 prevents fluid communication between power cylinders 34 and 36 between the outer periphery of sleeve 50 and the piston 28. The threads 54 extend for the entire length of the sleeve 50. The inner diameter of sleeve 50 is also broached for its entire length for a spline which mates with a spline 64 formed on a brake pump shaft 66. The pump brake pump shaft 66 is rotatably disposed in the housing 44 and is threadably connected at 68 to a brake pump piston 70 which is slidably disposed in the housing 44 and sealed therein by seals 72 and 74 to form pump cylinders or chambers 76 and 78. Fluid communication between the pump cylinder 76 and power cylinder 34 is prevented by a plurality of seals 80, and fluid leakage between the pump cylinders 76 and 78 along shaft 66 is prevented by seal 82.

The housing 44 has brake fluid inlet passage 84, a right brake output passage 86 and a left brake output passage 88. The brake output passages 86 and 88 are in fluid communication with the brake pump cylinders 76 and 78 respectively. The piston 70 is centered in the housing 44 by a centering spring 90 which is compressed between washers 92 and 94. The washer 92 abuts a shoulder 96 on the housing 44 and a shoulder 98 on the piston 70, while the washer 94 abuts a shoulder 100 on an end cover 102 and a lock ring 104 secured to the piston 70. The centering spring 90 also applies a preload to the threaded connection 68, which preload assists in determining the torque necessary to rotate brake pump shaft 66 relative to piston 70. In the centered position shown fluid pressure in passage 84 is equally distributed past champhers 106 and 108 formed on the piston 70 to cylinders 76 and 78 respectively from which the pressure is directed to passages 86 and 88 respectively. The piston 70 is prevented from rotating relative to housing 44 by splines 110 and the housing 44 is prevented from rotating relative to a housing 12 by a fastener 112 and locking plate 114. The plug 22 and end cover 102 cooperate to maintain shafts 56 and 66 in abutting relation.

In the conventional power assist steering mode, fluid pressure is directed from a conventional power steering pump, not shown, to the steer control valve assembly 14 in a well known manner. If the operator desires to perform a steer maneuver, the input shaft 26 is manually rotated such that fluid pressure is directed to power cylinder 34 for a right hand turn and power cylinder 36 for a left hand turn. The rotary input motion on shaft 26 is also imposed on the worm shaft 56 such that relative rotation between the worm shaft 56 and sleeve shaft 50 will occur. However, only minimum torque is transmitted through the threaded connection 54 since hydraulic pressure in cylinder 34 or 36 will cause the piston 28 and therefore sleeve 50 to move linearly relative to the worm shaft 56. The spline connection 64 permits relative sliding movement to occur between sleeve 50 and the brake pump shaft 66. However, if for some reason hydraulic pressure is not available in power cylinder 34 or 36 for power assist during a steer maneuver, the steering input torque imposed on shaft 26 is transmitted to worm shaft 56. Since the power assist is not available the thread connection 54 will try to move the sleeve 50 linearly and at the same time will transmit the input torque above the normal value required for power assist, from worm shaft 56 to the sleeve 50. If the steer torque is not excessive, the sleeve shaft 50 and the piston 28 will move linearly such that the steer output shaft 42 will be rotated by fully mechanical steering. If however the torque transmitted to the sleeve shaft 50 increases above a predetermined value, for example 4 foot pounds, the thread 52 will permit the sleeve 50 to rotate relative to piston 28 which will result in rotation of the brake pump shaft 66 due to the spline connection 64. If desirable, the friction forces in thread 52 can be reduced by replacing the thread with a conventional ball-nut type connection. However, the threaded construction is preferred for manufacturing economy. Rotation of the brake pump shaft 66 will, because of threaded connection 68, cause the piston 70 to be moved linearly relative to the housing 44. For example on a right hand turn, the piston 70 will be moved to the right in FIG. 1, such that the champhered edge 108 will be placed in sealing relationship with seal 72 thereby trapping the fluid in brake cylinder 76. Further linear movement of the piston 70 will result in increase in the fluid pressure in cylinder 76 and therefore in the right brake passage 86. Conversely, a left hand steering maneuver will result in the opposite movement of the piston 70 which will cause an increase in pressure in cylinder 78 and passage 88.

FIG. 2 shows the vehicle having a right front steerable wheel 120, a left front steerable wheel 122, a manual steering wheel 124, and a brake pedal and master cylinder 126. The manual steering wheel 124 is connected to the input shaft 26 of the steering gear 10. The master cylinder 126 is connected to passage 84, which passage 84 is also connected to brake elements on a pair of rear driving wheels 128 and 130. The right brake passage 86 is connected to the brakes of the right steerable wheel 120 and the left brake passage 88 is connected to the left steerable wheel 122.

As explained above, when hydraulic power steering assist is not present and the operator performs a right hand steering maneuver, the brake passage 86 is pressurized. When the brake passage 86 is pressurized, the steerable wheel 120 will be braked. Braking of the steerable wheel 120 will result in steering of that wheel in the desired direction due to the friction forces between the wheel and the road. Movement of the wheel 120 in the desired direction will result in the motion being transmitted back to the output shaft 42 of the steering gear 10 through a conventional steering linkage 132. Rotation of the output shaft 42 will result in movement of the piston 28 and will assist the driver in steering by reducing the torque input necessary to control the system. A steer maneuver to the left will result in braking of the left steerable wheel 122 which will then cause the left steerable wheel 122 to perform the required steer function and reduce the manual steer effort required by the operator. Return of the steering wheel 124 toward the center position will release the brake pressure by returning the piston 70 to the center position.

If the operator should be required to perform a brake function simultaneously with a steer function, when power assist is not available, hydraulic pressure from the master cylinder is applied to the wheel not being brake steered and to the low pressure side of piston 70 so as to augment the lateral force to piston 70 supplied by thread 68 so that the pressure in the brake steered wheel remains higher than the pressure to the other wheel by essentially the same amount it was before the brakes were applied. Therefore, the brakes can be applied simultaneously to a brake assisted maneuver without negating the brake assist feature.

If there is a hydraulic leak or an air or vapor pocket between the gear shown and the wheel braked for steering and the driver requires brake steering assist, the travel of piston 70 will be greater during the steering maneuver than is required with a well bled non leaking hydraulic system. This over travel of piston 70 can be more excessive, if after a steering maneuver requiring brake steering assist is instigated, the driver applies the brakes. It is conceivable that under these conditions, the application of brakes could augment the travel of piston 70 until piston 70 reaches the end of the allowable travel. When for any reason piston 70 is at the limit of its travel, an increase of pressure from the master cylinder does not show up as a rise in pressure in the brake line pressure to the wheel being braked for steering. The increase in brake line pressure from the master cylinder is passed on virtually undiminished to the non-steering wheel. This causes the pressure difference between the two brakes to be diminished with a resultant reduction in brake steering assist. Were it not for the two check valves 134 and 136 in piston 70, the pressure difference between the two brake systems could go to zero and then reverse so that brake steering assist would reverse. If the pressure differential goes to zero, one or the other of the check valves 134 or 136 disposed in piston 70 will open and allow the same pressure to be transmitted to both brake lines.

Obviously, many modifications and variations of the present invention are possible in light of the above teachings. It is, therefore, to be understood that within

What is claimed is:

1. In a vehicle having a pair of steerable road wheels, independently operable hydraulically actuated brake means associated with each of said road wheels respectively for retarding rotation of each of said road wheels selectively, and steering means including linkage means interconnecting said road wheels for simultaneously controlling the position of the latter in unison and relative to said vehicle to thereby control the direction of motion of said vehicle and a manually rotatable steering shaft operatively connected to said linkage means, the combination comprising; hydraulic pump means operatively connected to each of said independently operable brake means respectively for operating said brake means for the wheels, respectively, drive means disposed between said steering shaft and said pump means responsive to the magnitude and direction of torque applied to said steering shaft, said pump means being coupled to said steering shaft through said drive means when the applied torque achieves a predetermined magnitude, and respective passage means between said pump means and each of said brake means to be selectively pressurized by said pump means in response to the direction of said applied torque for directing pressurized hydraulic fluid from said pump means to selectively operate the respective one of said independently operable brake means to enforce turning of the steerable wheels in the same direction as the vehicle turn associated with said applied torque.

2. In a vehicle having a pair of steerable road wheels, independently operable hydraulically actuated brake means associated with each of said road wheels respectively for retarding rotation of each of said road wheels, selectively and steering means including linkage means and steering gear means interconnecting said road wheels for simultaneously controlling the positions of the latter in unison and relative to said vehicle to thereby control the direction of motion of said vehicle and a manually rotatable steering shaft operatively connected to said steering gear means, the combination comprising, hydraulic pump means disposed on said steering gear means and operatively connected to each of said independently operable brake means respectively and actuatable by a rotary force input to provide a quantity of pressurized hydraulic fluid to either of said independently operable brake means respectively, a pump shaft disposed in said pump means and operative upon rotation to actuate said pump means, drive means disposed between said steering shaft and said pump shaft responsive to the magnitude and direction of torque applied to said steering shaft for coupling the latter to said pump shaft when the applied torque achieves a predetermined magnitude, and respective passage means between said pump means and each of said brake means to be selectively pressurized by said pump means in response to the direction of said applied torque for directing pressurized hydraulic fluid from said pump means to selectively operate the corresponding one of said independently operable brake means to enforce turning of the steerable wheels in the same direction as the vehicle turn associated with said applied torque.

3. In a vehicle having a pair of steerable road wheels, independently operable hydraulically actuated brake means associated with each of said road wheels respectively for retarding rotation of each of said road wheels, and steering means including a steering gear assembly and linkage means interconnecting said road wheels for simultaneously controlling the positions of the latter in unison relative to said vehicle to thereby control the direction of motion of said vehicle and a manually rotatable steering shaft connected to a steering gear assembly, the combination comprising, a pump housing disposed on said steering gear assembly defining a pumping chamber, conduit means connecting opposite ends of said pumping chamber to respective ones of said independently operable brake means, a piston slidably disposed in said pumping chamber so that the latter is divided into a pair of pressure chambers each connected to a respective one of said independently operable brake means, each of said pressure chambers and said conduit means being completely filled with hydraulic fluid, a pump shaft disposed in said housing for rotation, screw thread means between said piston and said pump shaft operative to effect sliding movement of the former in response to rotation of the latter, said sliding movement being in a direction corresponding to the direction of rotation of said pump shaft and effecting pressurization of the hydraulic fluid in one of said pressure chambers for effecting concurrent actuation of the respective one of said independently operable brake means, and drive means disposed between said steering shaft and said pump shaft responsive to the magnitude and direction of torque applied to said steering shaft for coupling the latter to said pump shaft when the applied torque achieves a predetermined magnitude for effecting sliding movement of said piston in a direction corresponding to the direction of the applied torque to actuate the respective one of said independently operable brake means to enforce turning of the steerable wheels in the same direction as the vehicle turn associated with said applied torque.

4. In a vehicle having a pair of steerable road wheels, independently operable hydraulically actuated brake means associated with each of said road wheels respectively for retarding rotation of each of said road wheels, and steering means including linkage means interconnecting said road wheels for simultaneously controlling the positions of the latter in unison relative to said vehicle to thereby control the direction of motion of said vehicle, a rotatable steering shaft, a steering gear housing, a worm shaft disposed on said gear housing and being rotatable by said steering shaft, a rack piston supported on said housing for bodily shiftable movement along the axis of said worm shaft, a pitman shaft rotatably supported on said housing and being connected with said linkage means, and means between said rack piston and said pitman shaft for effecting pivotal movement of the latter in response to bodily shiftable movement of the former, the combination comprising, a pump housing disposed on said gear housing defining a pumping chamber, conduit means connecting opposite ends of said pumping chamber to respective ones of said independently operable brake means, a piston slidably disposed in said pumping chamber so that the latter is divided into a pair of pressure chambers each connected to a respective one of said independently operable brake means, each of said pressure chambers and said conduit means being completely filled with hydraulic fluid, a pump shaft rotatably disposed in said pump housing, screw thread means between said piston and said pump shaft operative to effect sliding movement of the former in response to rotation of the latter, said sliding movement being in a direction corresponding to the direction of rotation of said pump shaft and effecting pressurization of the hydraulic fluid in one of said pressure chambers for effecting concurrent actuation of the corresponding one of said independently operable brake means, a coupling member supported on said rack piston and around a portion of said worm shaft and a portion of said pump shaft for bodily shiftable movement as a unit with said rack piston and for rotation relative thereto, thread means between said coupling member and said worm shaft for effecting bodily shiftable movement of said coupling member and said rack piston in response to rotation of said worm shaft, means on said coupling member defining a plurality of axial splines, means on said pump shaft defining a corresponding plurality of axial splines engaging said coupling member splines thereby to connect said coupling member and said pump shaft for unitary rotation and for independent bodily shiftable movement, and spring means operative to prevent rotation of said pump shaft unless torque exceeding a predetermined magnitude is applied to the latter, said pump shaft thereby preventing rotation of said coupling member until a predetermined resistance to bodily shiftable movement of said rack piston is encountered whereupon the corresponding torque applied at said worm shaft is sufficient to overcome said spring means to effect unitary rotation of said worm shaft and said pump shaft and consequent sliding movement of said piston in a direction corresponding to the direction of rotation of said worm shaft thereby to actuate the corresponding one of said independently operable brake means to enforce turning of the steerable wheels in the same direction as the vehicle turn associated with the direction of rotation of said steering shaft.

* * * * *